(12) United States Patent
Peters et al.

(10) Patent No.: US 11,619,486 B2
(45) Date of Patent: Apr. 4, 2023

(54) BORESCOPE WITH PATTERN PROJECTION

(71) Applicant: Lufthansa Technik AG, Hamburg (DE)

(72) Inventors: Jan Oke Peters, Hamburg (DE); Michael Thies, Hamburg (DE); Sören Wedow, Lahnau (DE); Ronald Blöcher, Lahnau (DE); Oliver Neumann, Solms (DE); Tarek Mostafa, Schoeffengrund (DE); Werner Neddermeyer, Echternach (LU); Sönke Bahr, Darmstadt (DE); Sven Rasche, Hamburg (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 0 days.

(21) Appl. No.: 17/776,631

(22) PCT Filed: Nov. 13, 2020

(86) PCT No.: PCT/EP2020/082059
§ 371 (c)(1),
(2) Date: May 13, 2022

(87) PCT Pub. No.: WO2021/094534
PCT Pub. Date: May 20, 2021

(65) Prior Publication Data
US 2023/0003516 A1  Jan. 5, 2023

(30) Foreign Application Priority Data
Nov. 15, 2019 (DE) ............ 10 2019 130 950.6

(51) Int. Cl.
*G01B 11/25* (2006.01)
*G02B 6/04* (2006.01)

(52) U.S. Cl.
CPC ...... *G01B 11/2513* (2013.01); *G01B 11/2545* (2013.01); *G02B 6/04* (2013.01)

(58) Field of Classification Search
CPC ..... G01B 11/25; G01B 11/24; G01B 11/2513; G01B 11/2518; G01B 2210/58;
(Continued)

(56) References Cited

U.S. PATENT DOCUMENTS

| 6,051,842 | A | 4/2000 | Yamamoto | |
| 8,841,603 | B1 * | 9/2014 | Blanton | G01N 21/01 356/640 |
| 2001/0026324 | A1 * | 10/2001 | Saito | G02B 7/32 348/371 |
| 2003/0193657 | A1 | 10/2003 | Uomori et al. | |
| 2009/0225320 | A1 | 9/2009 | Bendall et al. | |
| 2010/0220293 | A1 | 9/2010 | Mizushima et al. | |
| 2010/0315652 | A1 * | 12/2010 | Yelin | G01B 9/0209 356/521 |

(Continued)

FOREIGN PATENT DOCUMENTS

| CN | 102778198 A * | 11/2012 | ............ A61B 1/05 |
| CN | 107726053 A * | 2/2018 | ............ F17D 5/02 |

(Continued)

*Primary Examiner* — Michael P Stafira
(74) *Attorney, Agent, or Firm* — Leydig, Voit & Mayer, Ltd.

(57) ABSTRACT

A borescope includes an electronic image capture unit having two image capture sensors as a borescope lens at an end of a shaft that is designed for being inserted into a borescope opening, a position and alignment of the image capture sensors in relation to one another being suitable for ascertaining three-dimension (3D) information using triangulation; and a pattern projector configured to project a pattern into a common recording region of the image capture sensors. The pattern projector includes: a fundamentally optically imaging light-guide bundle, which is made up of statistically distributed optical fibers having differing transmittances, to whose input surface a light source is coupled and whose output surface is aligned with the region captured by the image capture sensors.

11 Claims, 3 Drawing Sheets

(58) Field of Classification Search
CPC .............. G01B 11/2527; G01B 11/002; G01B 11/2416; G01B 11/2545; G01B 11/303; G01B 11/30; G01B 11/254; G01B 11/007; G01B 2210/50; G01B 9/02027; G01B 9/02042; G01B 11/2509; G01B 21/20; G01B 2210/54; G01B 11/2504; G01B 11/2522; G01B 5/012; G01B 9/04; G01B 7/046; G01B 11/2536; G01B 21/042; G01B 11/00; G01B 11/005; G01B 11/026; G01B 11/0608; G01B 21/32; G01B 9/02; G01B 11/03; G01B 11/04; G01B 11/14; G01B 11/245; G01B 21/04; G01B 21/045; G01B 2290/45; G01B 5/20; G01B 9/02056; G01B 9/02091; G01B 11/2425; G01B 11/2433; G01B 11/2531; G01B 9/02069; G01B 11/02; G01B 11/0625; G01B 11/22; G01B 11/2441; G01B 11/306; G01B 21/00; G01B 2210/56; G01B 2290/65; G01B 5/0014; G01B 5/0016; G01B 9/0203; G01B 9/02055

See application file for complete search history.

(56) References Cited

U.S. PATENT DOCUMENTS

| | | | |
|---|---|---|---|
| 2010/0317975 A1* | 12/2010 | Yelin | G01J 3/0218 356/432 |
| 2013/0286407 A1 | 10/2013 | Elson et al. | |
| 2014/0071238 A1 | 3/2014 | Mertens et al. | |
| 2014/0320629 A1* | 10/2014 | Chizeck | G06T 15/04 348/81 |
| 2018/0045510 A1 | 2/2018 | Zahi et al. | |
| 2018/0270465 A1 | 9/2018 | Bendall | |
| 2019/0145905 A1* | 5/2019 | Sibbach | H04N 7/183 348/82 |
| 2019/0196163 A1* | 6/2019 | Kim | A61B 90/361 |
| 2019/0279380 A1 | 9/2019 | Bendall | |

FOREIGN PATENT DOCUMENTS

| | | | | |
|---|---|---|---|---|
| DE | 112014000509 T5 | 11/2015 | | |
| JP | H10239031 A | 9/1998 | | |
| JP | 2017217215 A | 12/2017 | | |
| WO | WO-2017003650 A1 * | 1/2017 | ........... | G01B 11/002 |

* cited by examiner

BORESCOPE WITH PATTERN PROJECTION

CROSS REFERENCE TO RELATED APPLICATIONS

This application is a U.S. National Phase application under 35 U.S.C. § 371 of International Application No. PCT/EP2020/082059, filed on Nov. 13, 2020, and claims benefit to German Patent Application No. DE 10 2019 130 950.6, filed on Nov. 15, 2019. The International Application was published in German on May 20, 2021 as WO 2021/094534 A1 under PCT Article 21(2).

FIELD

The present disclosure relates to a borescope, in particular for borescoping aircraft engines.

BACKGROUND

Borescopes are used for inspecting technical equipment in regions that are not directly visually accessible. The borescopes can be introduced into the regions of interest through small openings and offer a view of otherwise not visually accessible areas either directly using an optical unit or by way of a display of a video image recorded by a suitable sensor system at the borescope tip, also referred to as a video borescope. The shaft of the borescope can here be rigid or be flexible so as to even better pass into difficult-to-access areas.

Furthermore borescopes may have two image sensors that are arranged at the borescope tip, whose recording regions overlap such that three-dimension (3D) information, specifically the distance of the individual image points from the borescope tip, can be derived in principle from simultaneously recorded images with the aid of triangulation methods. The 3D information acquired from different positions using a corresponding borescope can be combined with the associated image information to form a 3D model, with the aid of which a detailed assessment of the recorded object can then be performed.

In particular, in cases in which the region to be captured by the borescope is low-contrast, errors may occur when ascertaining 3D information from the recorded images of the two image sensors by way of triangulation, or a corresponding ascertainment is not possible at all, since, in order to be able to acquire 3D information by way of triangulation, it is necessary to be able to in each case uniquely identify individual object points on simultaneously recorded images of the two image sensors in order to estimate the distance of the object point from the image sensors based on the distance of the object points represented on the two images in the case of superposition. If individual object points cannot be identified due to a lack of contrast, no 3D information can be acquired either.

A pattern of individual points can be projected onto the surface to be recorded, which are then used as support points for the triangulation. Interpolation is subsequently performed between the ascertainable pieces of 3D information for the individual points. The resolution of the 3D data in this embodiment is discernible and inadequate for example for inspecting engine blades of an aircraft engine using a borescope.

Alternatively, the 3D information may be ascertained by structured-light scanning, although it is here absolutely necessary that the relative pose between the borescope and the region to be recorded, and the region to be recorded itself do not change during the capturing time period. This results in a significant expenditure of time in particular in the case of larger equipment to be inspected.

SUMMARY

In an embodiment, the present disclosure provides a borescope that includes an electronic image capture unit having two image capture sensors as a borescope lens at an end of a shaft that is designed for being inserted into a borescope opening, a position and alignment of the image capture sensors in relation to one another being suitable for ascertaining three-dimension (3D) information using triangulation; and a pattern projector configured to project a pattern into a common recording region of the image capture sensors. The pattern projector includes: a fundamentally optically imaging light-guide bundle, which is made up of statistically distributed optical fibers having differing transmittances, to whose input surface a light source is coupled and whose output surface is aligned with the region captured by the image capture sensors.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
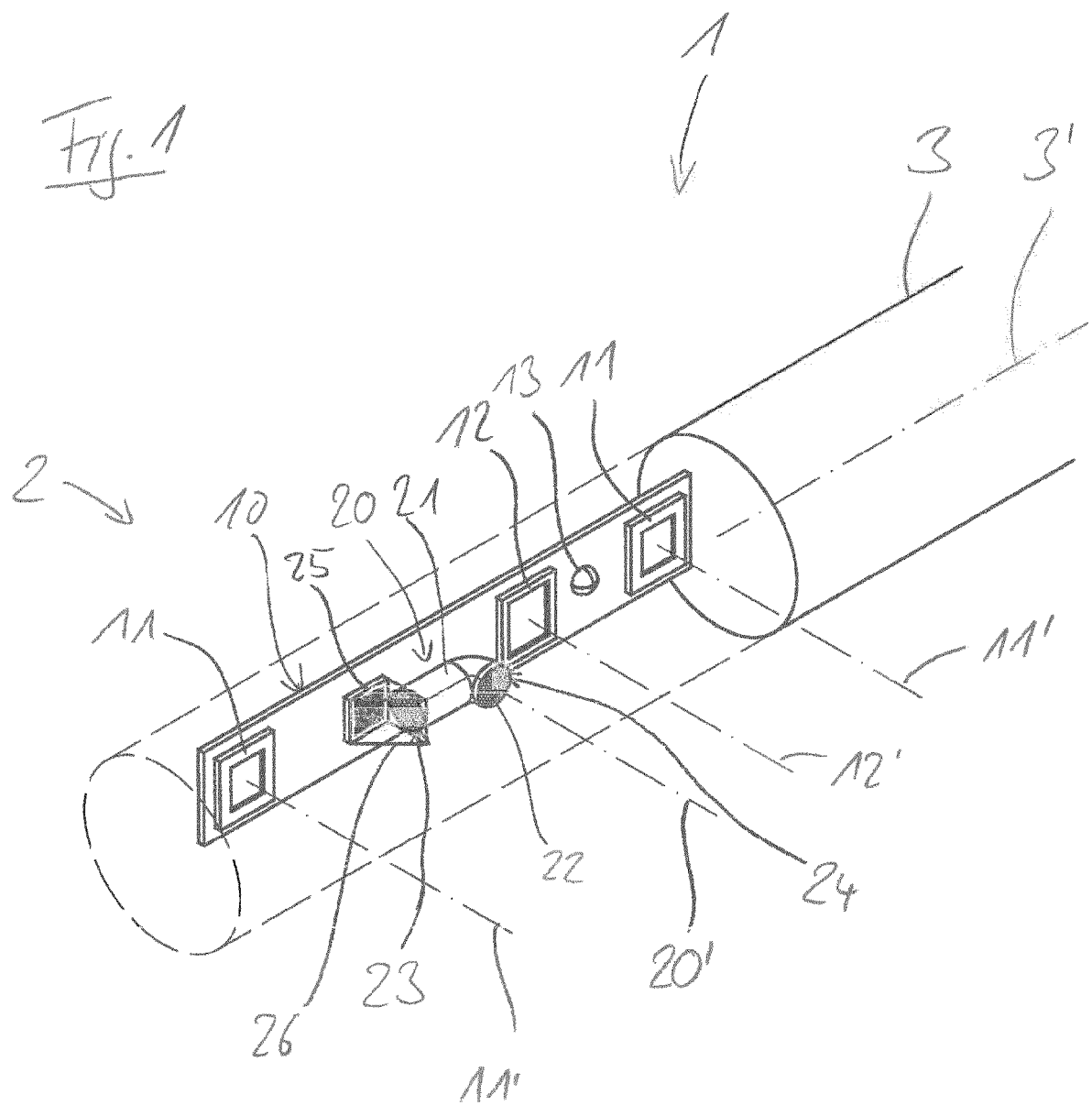
FIG. 1 shows a schematic illustration of the borescope tip of an exemplary embodiment of a borescope according to the present disclosure.

One or more aspects of the present disclosure provide a borescope that is improved compared to the prior art and allows reliable and high-resolution ascertainment of 3D information even when recording low-contrast regions.

Accordingly, an embodiment of the present disclosure relates to a borescope, in particular for borescoping aircraft engines, comprising an electronic image capture unit having two image capture sensors as a borescope lens at the end of a shaft that is designed for being inserted into a borescope opening, wherein the position and alignment of the image capture sensors in relation to one another are suitable for ascertaining 3D information using triangulation, and wherein a pattern projector for projecting a pattern into the common recording region of the image capture sensors is provided, which pattern projector comprises an optically imaging light-guide bundle, which is made up of statistically distributed optical fibers having differing transmittances, to whose input surface a light source is coupled and whose output surface is aligned with the region captured by the image capture sensors.

Onto a surface to be captured by the borescope, a highly asymmetric detailed pattern is projected onto the surface using the pattern projector according to an aspect of the present disclosure, as a result of which the contrast on the surface is enhanced for the individual surface points, with the result that the ascertainment of 3D information based on the image information recorded by the two image capture sensors is improved or made possible in the first place even in the case of surfaces that originally had low contrast.

According to an aspect of the present disclosure, the pattern is generated using an optically imaging light-guide bundle similar to a fiber-optic unit, the individual optical fibers of which have at least partially differing transmittances. By the light-guide bundle being optically imaging in principle, for which the individual light-guide fibers need to have a sufficiently small diameter, it is ensured that the individual pattern points generated by the pattern projector have a sufficiently small resolution, frequently comparable to the resolution of the image capture sensors.

The actual projected pattern is here mainly generated by the light-guide bundle itself. By virtue of the fact that the individual optical fibers have differing transmittances and that they are statistically distributed in the light-guide bundle, a random light intensity distribution is already obtained at the output surface in the case of a uniform light introduction at the input surface by way of the light source, which light intensity distribution on the surface, at which the output surface is directed, a contrast pattern that improves the ascertainment of 3D information using triangulation for low-contrast surfaces in terms of accuracy or makes it possible in principle in the first place in the case of no-contrast surfaces. In this case, the speed advantages of triangulation compared to the structured-light scanning fully come into effect.

It is here already sufficient to use optical fibers having only two differing transmittances because a sufficiently detailed pattern can be projected due to the statistic distribution and the small diameters of the optical fibers resulting from the requirement relating to optical imaging. Some of the optical fibers can also have a transmittance of zero.

The differing transmittances of the individual optical fibers can be achieved by suitably selecting different core-to-cladding ratios (cladding to core diameter ratio; CCDR) of the optical fibers. Due to the core-to-cladding ratio, which relates to the internal structure of an optical fiber, the transmittance of an optical fiber can be changed while keeping the outer diameter constant and when using the same materials for the core and cladding. The light-guide bundle can have a diameter from 0.5 mm to 1.10 mm, preferably from 0.89 mm to 0.90 mm, and/or comprise 6500 to 10,000, preferably 7700 to 7900, optical fibers. The individual optical fibers can have a diameter of from 8 µm to 10 µm.

Due to the small diameter of the light-guide bundle, the pattern projector provided according to an aspect of the present disclosure can as a rule be integrated into the tip of a borescope without difficulty, alongside the image capture sensors. In particular, the outer diameter of the borescope does not need to be enlarged compared to known borescopes. The pattern projector is here integrated in accordance with the present disclosure together with the image capture sensors into the tip of a borescope, wherein the pattern projector and the image capture sensors are aligned in relation to one another such that 3D information can be ascertained using triangulation on the basis of the pattern projection recorded by the image capture sensors.

In principle, it is possible to guide the light-guide bundle through the shaft of the borescope and to connect an externally arranged light source to the input surface of the light-guide bundle. However, it is preferred if the light source comprises an LED. The use of an LED as the light source makes sufficient miniaturization of the pattern projector possible so that the latter can be arranged in its entirety, that is to say including the light source, in the tip of the borescope. A sufficient number of light-intense LEDs with low heat generation are known from the prior art, wherein the LEDs are preferably designed in particular for coupling light into the light-guide bundle and/or are selected with respect to good light efficiency.

If the heat generation of the light source is not sufficiently low, the light source of adjacent electronic components can be thermally decoupled.

At least one optical element for beam deflection, such as for example a prism, can be provided between the light source and the input surface. With a corresponding optical element, the design and the dimensions of the pattern projector can be adapted to the circumstances of a borescope.

Alternatively or in addition, at least one optical element for beam influencing, for example a stop and/or a lens element, can also be provided. With one or more optical elements for beam influencing, the properties of the projected pattern can be influenced. For example, a collimator optical unit can be provided in order to make the light from the light source more uniform before it enters the light-guide bundle. Such a collimator optical unit aligns the light from the light source as homogeneously as possible over the entire surface of the light-guide bundle before it enters the light-guide bundle. The projected pattern is then generated practically solely by the differing transmittances of the individual optical fibers.

The light source is designed for emitting light in a wavelength range that is in principle capturable by the image capture sensors. The light source can in particular be designed for emitting white light and/or infrared light.

The recording cones of the image capture sensors are preferably aligned at a specified viewing angle with respect to the shaft. If this viewing angle is 90°, regions laterally of the image capture unit can be captured. With a different selection of the viewing angle in deviation from 90°, regions located in the insertion direction of the borescope in front of it (angular range 30°-90°) or regions located therebehind (angular range 90°-150°) can be captured. However, it is also possible to provide a plurality of pairs of image capture sensors provided for triangulation on an individual borescope, which each have different viewing angles. In particular, two pairs of image capture sensors can be provided, wherein the recording cones of both image capture sensors of one pair are aligned at a different viewing angle with respect to the shaft axis than the recording cones of both image capture sensors of the other pair. In this case, a plurality of pattern projectors can be provided, or a pattern projector is configured such that it projects a pattern into the respective recording regions of the image capture sensor pairs.

The image capture unit can comprise at least one image capture sensor for capturing color images. Here, the color images captured by this at least one image capture sensor can be used directly for triangulation, in particular in the case of active pattern projection. However, it is also possible that 3D information, ascertained on the basis of grayscale images recorded by a pair of image capture sensors, is supplemented with the color information of a color image capture sensor in order to obtain colored 3D information or a colored 3D model in this way. Using grayscale image capture sensors for ascertaining 3D information can be advantageous due to the higher resolution in the case of identical sensor size compared to color image capture sensors. For capturing the color image, in this case the pattern projection is preferably temporarily interrupted so as not to falsify the color information. For this case, a separate alternative light source can be provided for temporarily uniformly illuminating the recording region of the color image capture sensor.

The image capture sensors are preferably charge-coupled device (CCD) sensors or complimentary metal-oxide semiconductor (CMOS) sensors, preferably with global shutter. The image capture sensors preferably have a resolution of 400×400 pixels to 2400×2400 pixels, a frame rate of up to 240 recordings per second, and/or an image field opening angle of 30° to 120°, preferably 35° to 65°, with further preference of 40°, 50° or 60°, in each case ±5°, preferably in each case ±3°. With corresponding image capture sensors, in particular continuous recording of image information is also possible.

The shaft of the borescope can be rigid or flexible. If the shaft is flexible, the borescope can be guided for example through a guide tube. The guide tube can in this case be part of the borescope or of a separate guide apparatus. Using the guide tube, the fundamental position of the borescope or of the image capture unit thereof in the interior of the region to be inspected with the borescope can then be defined. The shaft can also be provided with wire pulleys, which make direct control of the shaft possible. However, it is also possible to guide the borescope with a flexible shaft loosely through a region to be recorded and to create the desired recordings in particular when the borescope is pulled out.

FIG. 1 schematically shows the tip 2 of a borescope 1, which can be introduced into the regions to be examined of a technical piece of equipment, such as for example an aircraft engine. The borescope 1 comprises a flexible shaft 3, which is controllable via wire pulleys. The axis of symmetry of the shaft 3 forms the shaft axis 3'.

Provided at the tip 2 of the borescope 1 on the shaft 3 is an electronic image capture unit 10, which, in the used state of the borescope 1, is surrounded by a transparent protective housing 4, which is merely indicated by dashes in FIG. 1.

The image capture unit 10 comprises two spaced-apart grayscale image capture sensors 11, the recording cones of which overlap such that 3D information can be derived from the images of the two image capture sensors 11 for the overlap region using triangulation. Moreover, a color-image image capture sensor 12 is provided, which likewise captures the overlap region of the two other image capture sensors 11. The color image information of the image capture sensor 12 can be used to enrich the 3D information acquired by way of the two other image capture sensors 11 with color information. Corresponding methods herefor are known in the prior art.

The image capture sensors 11, 12 are furthermore arranged such that their recording cones or their recording axes 11', 12' are aligned at a specified viewing angle of 90° with respect to the shaft axis 3'.

In order to make capture of a color image possible by way of the corresponding image capture sensor 12, an LED is provided as an alternative light source 13, with which the recording region of the image capture sensor 23 can be temporarily illuminated sufficiently for capturing a color image.

In addition, the image capture unit 10 comprises a pattern projector 20, with which a pattern is provided in the common recording region of the image capture sensors 11 provided for triangulation.

Figure 3:
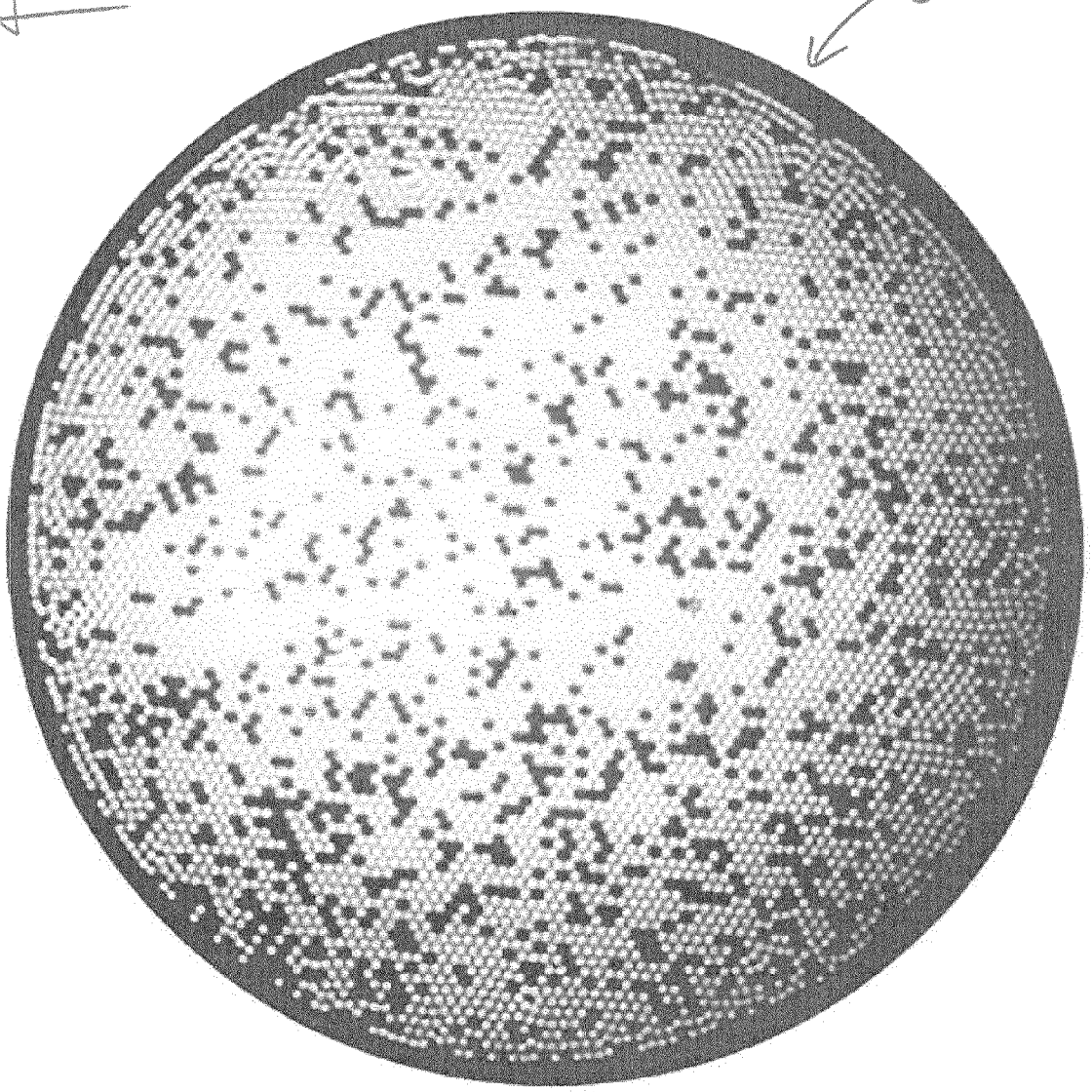
FIG. 3 shows a schematic illustration of the pattern projected by a borescope according to the present disclosure in accordance with one of FIG. 1 or 2.

The pattern projector 20 comprises a light-guide bundle 21 having approximately 7800 optical fibers 22, which each have a diameter of approximately 9 μm. Due to the multiplicity of optical fibers 22 and their diameters, the light-guide bundle 21 is in principle considered to be optically imaging. However, the optical fibers 22 of the light-guide bundle 21 have differing transmittances, wherein the optical fibers 22 either belong to a first group having a high transmittance or to a second group having a significantly lower transmittance. Since the corresponding optical fibers 22 are statistically distributed, a pattern 50, as is illustrated by way of example in FIG. 3, is obtained at the output surface 24 of the light-guide bundle 21 or in the projection when light is uniformly introduced into the input surface 23. The individual points of the pattern 40 here substantially correspond to the resolution of the image capture sensors 11. The brightness of the points is determined solely by the transmittance of the respective optical fibers 22. Owing to the statistic distribution of the individual optical fibers 22 having differing transmittances, the projected pattern 50 is highly asymmetric and detailed.

By projecting the pattern 50 onto a surface that is to be captured by the image capture sensors 11 for the purposes of triangulation, additional contrast is applied, which makes individual image points of the captured image data or points of the projected pattern in these image data uniquely assignable, as a result of which the ascertainment of 3D information by way of triangulation is also possible in surfaces that originally have low contrast.

For the ultimate projection of the pattern 22, a surface-mounted white-light light-emitting diode is provided as a light source 25, whose light is coupled, via a prism as an optical element for radiation deflection 26, into the input surface 23 of the light-guide bundle 21. The arrangement of the light source 25, the optical element for radiation deflection 26, and the light-guide bundle 21, as shown in FIG. 1, makes a small construction height possible compared to the remaining components of the image capture unit 10 while simultaneously aligning the projection axis 20' parallel to the recording axes 11', 12' of the image capture sensors 11, 12.

Figure 2:
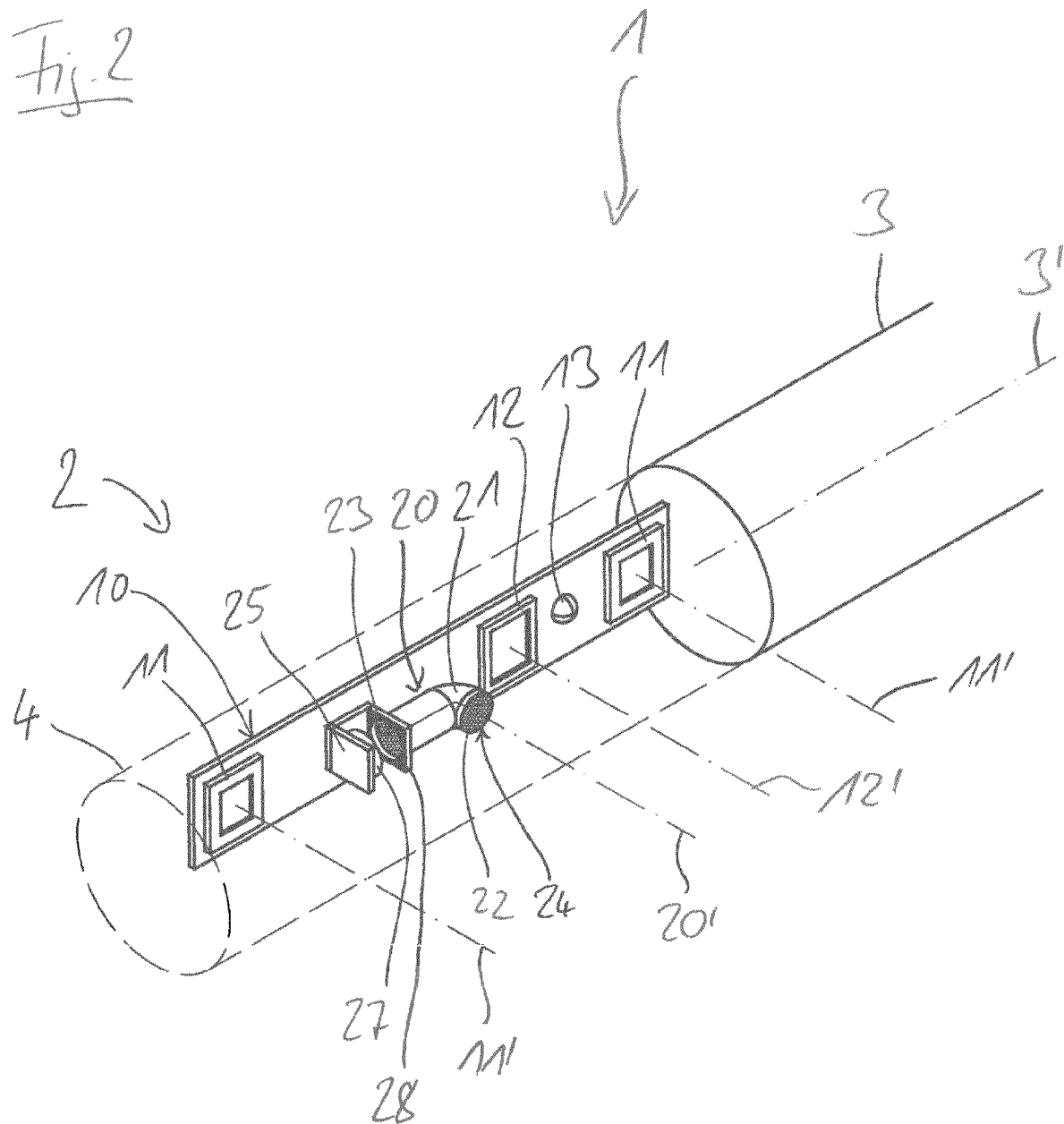
FIG. 2 shows a schematic illustration of the borescope tip of an exemplary embodiment of a borescope according to the present disclosure.

FIG. 2 illustrates an exemplary embodiment of a borescope 1, which largely corresponds to the exemplary embodiment from FIG. 1. For this reason, only the differences of the alternative exemplary embodiment will be mentioned below, and reference is made to the above statements regarding the rest.

The differences of the exemplary embodiment according to FIG. 2 are limited to coupling the light source 25 to the input surface 23 of the light-guide bundle 21, which is otherwise designed identically to FIG. 1.

The white-light light-emitting diode, as a light source 25, is directed directly at the input surface 23 of the light-guide bundle 21, wherein a collimator lens element 27 and a stop 28 are provided between the light source 25 and the input surface 23. With these elements for beam influencing 27, 28, a homogeneous integration of light into the light-guide bundle 21 over the entire input surface 23 is ensured.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A borescope, in particular for borescoping aircraft engines, the borescope comprising:
   an electronic image capture unit comprising two image capture sensors as a borescope lens at an end of a shaft that is designed for being inserted into a borescope opening, a position and alignment of the image capture sensors in relation to one another being suitable for ascertaining three-dimension (3D) information using triangulation; and
   a pattern projector configured to project a pattern into a common recording region of the image capture sensors, the pattern projector comprising:
   a fundamentally optically imaging light-guide bundle, which is made up of statistically distributed optical fibers having differing transmittances, to whose input surface a light source is coupled and whose output surface is aligned with the region captured by the image capture sensors.

2. The borescope as claimed in claim 1, wherein the light-guide bundle has a diameter from 0.5 mm to 1.10 mm.

3. The borescope as claimed in claim 1, wherein the light-guide bundle comprises 6500 to 10,000 optical fibers.

4. The borescope as claimed in claim 1, wherein an individual optical fiber has a diameter of 8 μm to 10 μm.

5. The borescope as claimed in claim 1, wherein the light source comprises at least one light emitting diode (LED).

6. The borescope as claimed in claim 1, the borescope comprising at least one optical element configured for beam deflection or configured for beam influencing between the light source and the input surface.

7. The borescope as claimed in claim 1, wherein the light source is configured to output white light or infrared light.

8. The borescope as claimed in claim 1, wherein recording cones of the image capture sensors are aligned at a specified viewing angle with respect to the shaft.

9. The borescope as claimed in claim 1, wherein the image capture unit comprises at least one image capture sensor for capturing color images.

10. The borescope as claimed in claim 1, wherein the shaft is a flexible shaft.

11. The borescope as claimed in claim 6, wherein the at least one optical element for beam deflection comprises a prism, and the at least one optical element for beam influencing comprises a stop or a lens element.

* * * * *